United States Patent
Haba et al.

(10) Patent No.: US 10,167,017 B2
(45) Date of Patent: Jan. 1, 2019

(54) STEERING WHEEL

(71) Applicant: TAKATA CORPORATION, Tokyo (JP)

(72) Inventors: Yutaka Haba, Shiga (JP); Kenshi Nagata, Shiga (JP); Takuya Yoneda, Shiga (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 15/603,047

(22) Filed: May 23, 2017

(65) Prior Publication Data

US 2017/0341683 A1    Nov. 30, 2017

(30) Foreign Application Priority Data

May 25, 2016 (JP) .................................. 2016-104542
Dec. 27, 2016 (JP) .................................. 2016-253399

(51) Int. Cl.

| B62D 15/02 | (2006.01) |
| B60Q 9/00 | (2006.01) |
| B62D 1/06 | (2006.01) |
| B62D 1/08 | (2006.01) |
| B62D 1/04 | (2006.01) |

(52) U.S. Cl.
CPC ............. B62D 15/029 (2013.01); B60Q 9/00 (2013.01); B62D 1/046 (2013.01); B62D 1/06 (2013.01); B62D 1/08 (2013.01)

(58) Field of Classification Search
CPC ........ B62D 15/029; B62D 1/046; B62D 1/06; B62D 1/08; B60Q 9/00
See application file for complete search history.

(56) References Cited

U.S. PATENT DOCUMENTS

| 6,327,932 B1 * | 12/2001 | Onodera .............. B60Q 1/0082 74/552 |
| 7,852,225 B2 | 12/2010 | Lemasson |
| 8,532,882 B2 | 9/2013 | Akiyama |
| 9,598,098 B2 | 3/2017 | Sakurai et al. |

(Continued)

FOREIGN PATENT DOCUMENTS

| DE | 10 2008 040 156 A1 | 1/2010 |
| DE | 10 2008 036 161 A1 | 2/2010 |

(Continued)

*Primary Examiner* — Thomas C Diaz
(74) *Attorney, Agent, or Firm* — Fitch, Even, Tabin & Flannery LLP

(57) ABSTRACT

A steering wheel includes a steering hub portion, a wheel portion and a spoke portion. The spoke portion extends from the steering hub portion and is connected with the wheel portion. The wheel portion includes a core metal and a cover layer. The core metal circles around the steering wheel. The cover layer covers the core metal. A vibrator housing portion is provided at a part in a circling direction of the core metal. The core metal includes a U-shaped cross section in the vibrator housing portion in a radial direction of the wheel portion. A partition wall is provided inside of the core metal to divide and form the vibrator housing portion. A case is attached to the core metal to cover the vibrator housing portion. The vibrator is disposed in the vibrator housing portion between the core metal and the case. The vibrator is attached to the case.

7 Claims, 8 Drawing Sheets

(56) References Cited

U.S. PATENT DOCUMENTS

| | | |
|---|---|---|
| 2012/0063104 A1 | 3/2012 | Moser et al. |
| 2013/0147284 A1 | 6/2013 | Chun |
| 2016/0023677 A1 | 1/2016 | Sakurai et al. |
| 2016/0114826 A1* | 4/2016 | Moinard ............. B62D 1/046 74/552 |
| 2017/0021854 A1* | 1/2017 | Mitobe ................ B62D 1/06 |

FOREIGN PATENT DOCUMENTS

| | | |
|---|---|---|
| DE | 10 2012 207 945 A1 | 6/2013 |
| EP | 0 856 432 A2 | 8/1998 |
| EP | 1 901 596 B1 | 8/2011 |
| JP | 2008-56172 A | 3/2008 |
| JP | 2008-162466 A | 7/2008 |
| JP | 2009-132359 A | 6/2009 |
| JP | 2010-149644 A | 7/2010 |
| JP | 2013-244767 A | 12/2013 |
| JP | 2016-30471 A | 3/2016 |
| KR | 10-2004-0038951 A | 5/2004 |
| KR | 10-1244175 B1 | 3/2013 |
| WO | 2011/129747 A1 | 10/2011 |
| WO | 2014/198499 A1 | 12/2014 |

\* cited by examiner

STEERING WHEEL

CROSS-REFERENCE TO RELATED APPLICATIONS

This application claims the benefit of Japanese Patent Application Nos. 2016-104542, filed on May 25, 2016, and 2016-253399, filed on Dec. 27, 2016, the entire contents of which are hereby incorporated by reference, the same as if set forth at length, the entire of which are incorporated herein by reference.

TECHNICAL FIELD

The present invention relates to a steering wheel provided with a vibrator.

BACKGROUND ART

A steering wheel is known in which a lane of a road is recognized by a camera, and a case where a vehicle deviates from the lane or a case where deviation is expected is informed to a driver by allowing a steering wheel to oscillate by a vibration motor.

In the steering wheel of the related art, the vibration motor is attached to a spoke portion (for example, refer to JP-A-2016-30471). Therefore, it is necessary to have the spoke portion for attaching the vibration motor or to increase the thickness of the spoke portion for ensuring an attaching space of the vibration motor, whereby a degree of freedom in design of the steering wheel is restricted.

SUMMARY OF INVENTION

An object of the invention is to provide a steering wheel that includes a vibrator and has a high degree of freedom in design.

A steering wheel of this invention includes a steering hub portion, wheel portion and a spoke portion. The spoke portion extends from the steering hub portion and is connected with the wheel portion. The wheel portion includes a core metal and a cover layer. The core metal circles around the steering wheel. The cover layer covers the core metal. A vibrator housing portion is provided at a part in a circling direction of the core metal. The core metal includes a U-shaped cross section in the vibrator housing portion in a radial direction of the wheel portion. A partition wall is provided inside of the core metal to divide and form the vibrator housing portion. A case is attached to the core metal to cover the vibrator housing portion. The vibrator is disposed in the vibrator housing portion between the core metal and the case. The vibrator is attached to the case.

In the steering wheel, the case includes a bottom surface, longitudinal sidewalls and lateral sidewalls. The bottom surface has a rectangular shape. The longitudinal sidewalls rise up from side portions of the bottom surface in a longitudinal direction. The lateral sidewalls rise up from the side portions of the bottom surface in a lateral direction.

In the steering wheel, a partition is vertically installed from the bottom surface to divide the inside of the case. The partition extends along the lateral direction. The vibrator is attached to the partition.

In the steering wheel, the vibrator includes a motor main body, a rotation driving shaft which protrudes from the motor main body, and a weight which is attached to the rotation driving shaft. A notch is provided in the partition. The rotation driving shaft is inserted into the notch. The motor main body is attached to the partition.

In the steering wheel, the longitudinal sidewall of the case and a sidewall of the core metal face each other. The lateral sidewall of the case and the partition wall of the core metal face each other.

In the steering wheel, a bolt insertion hole is provided in a first overhang portion which overhangs toward an outer side of the case from the lateral sidewall of the case. A bolt hole is provided in a second overhang portion which overhangs on a side opposite to the vibrator housing portion from the partition wall of the core metal. A bolt inserted into the bolt insertion hole is screwed to the bolt hole.

In the steering wheel, a sealing material is provided between the case and the core metal, and between the case and the partition wall.

The steering wheel further includes a wiring. The wiring is inserted into a wiring hole provided on the lateral sidewall. The wiring is disposed along the circling direction inside the core metal.

In the steering wheel, a tip end portion of the wiring is connected to an electronic control circuit. The electronic control circuit is housed in a board housing case of which at least one surface is open. An open surface of the board housing case is covered with another member.

In the steering wheel, a dimension of the weight of the vibrator in a direction orthogonal to the rotation driving shaft is smaller than a width of the motor main body. The dimension of the weight of the vibrator is smaller than a height of the motor main body.

In the steering wheel, the case is curved in the longitudinal direction.

In the steering wheel of the invention, the vibrator housing portion which is formed to be divided on the inside of the core metal is covered with the case and the vibrator is disposed in the vibrator housing portion between the core metal and the case. Since it is not necessary to attach the vibrator to the spoke portion, it is possible to increase a degree of freedom in design of the steering wheel.

DESCRIPTION OF EMBODIMENTS

Hereinafter, an embodiment will be described with reference to the drawings. In the following description, a leftward direction and a rightward direction of a steering wheel respectively match a leftward direction and a rightward direction of a vehicle body in a state where the steering wheel is in a steering orientation when a vehicle advances straight. In addition, a twelve o'clock side and a six o'clock side of the steering wheel indicate an upper side and a lower side when the steering wheel is viewed from a front surface (that is, from an occupant side), a three o'clock side indicates a right side, and a nine o'clock side indicates a left side.

Figure 1:
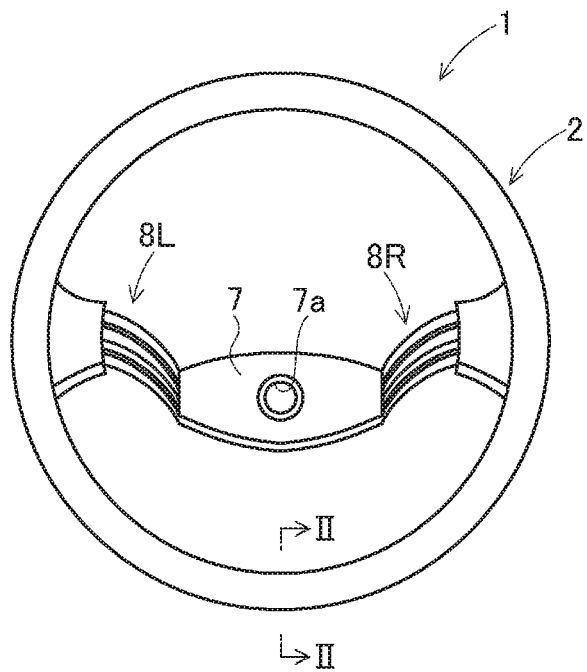
FIG. 1 is a front view of a steering wheel according to an embodiment.
Figure 2:
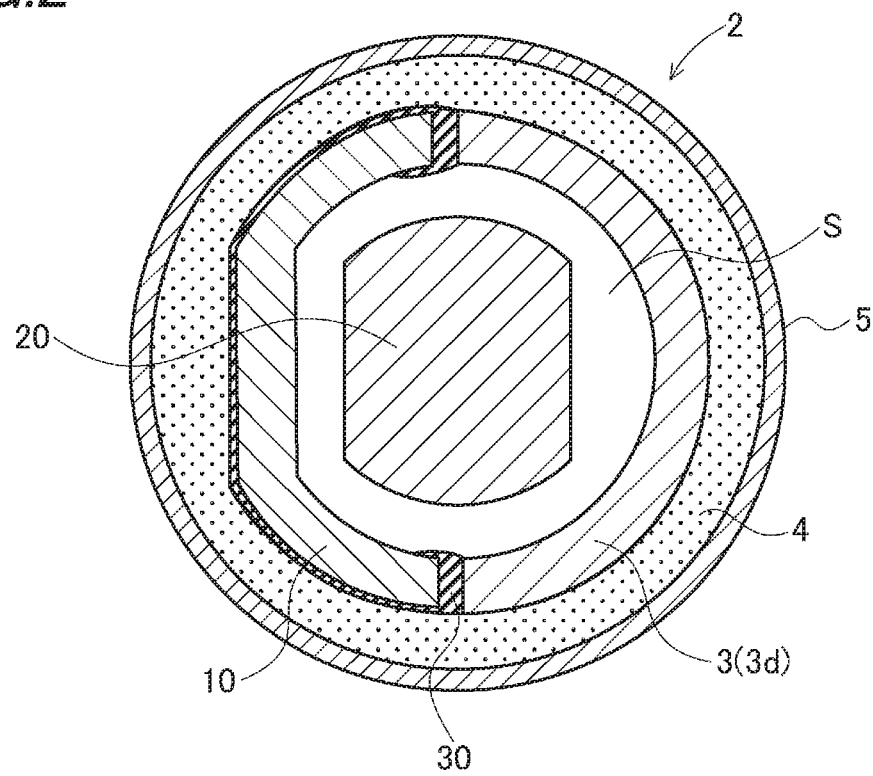
FIG. 2 is a sectional view taken along a line II-II of FIG. 1.

FIG. 1 is a front view of a steering wheel 1 according to the embodiment, and FIG. 2 is a sectional view taken along a line II-II of FIG. 1. The steering wheel 1 is a so-called two-spoke type in the embodiment, each of spoke portions 8L and 8R extends toward the left and right sides from a steering hub portion 7 at the center, and tip end sides of each of the spoke portions 8L and 8R are respectively corrected with a wheel portion 2 at an outer circumference of the steering wheel 1.

The number and disposition of the spoke portions provided in the steering wheel 1 are not limited thereto. A boss portion 7a at the center of the steering hub portion 7 is engaged with a tip end of a steering shaft (not illustrated) of the vehicle.

The wheel portion 2 includes an annular core metal 3 (refer to FIG. 6) which circles around the steering wheel 1, and a cover layer that covers the core metal 3. In the embodiment, the cover layer includes a foamed synthetic resin layer (urethane foam layer 4 in the embodiment); and leather 5 which covers the urethane foam layer 4 and forms an outermost surface of the wheel portion 2. The leather 5 rolls around the urethane foam layer 4 one time and is stitched by a suture (not illustrated). As the leather 5, artificial leather can be used in addition to natural leather, such as cowhide.

A vibrator 20 is installed in a vibrator housing portion S (refer to FIG. 6) provided on the six o'clock side (lower side) of the wheel portion 2. The vibrator 20 is fixed to a case 10 and the case 10 is attached to the core metal 3.

Figure 3:
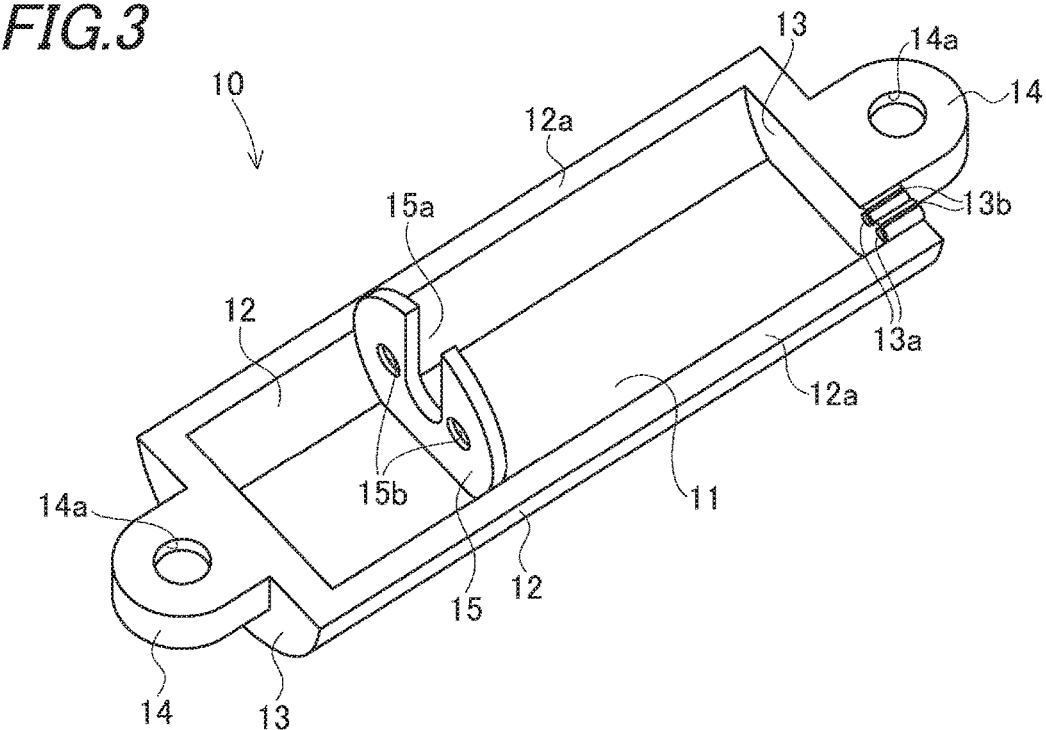
FIG. 3 is a perspective view of a vibrator case.

FIG. 3 is a perspective view of the case 10. As illustrated in FIG. 3, the case 10 is a long box-like container of which an upper surface is open, including a bottom surface 11 having a substantially rectangular shape; longitudinal sidewalls 12 and 12 which rise up from a side portion of the bottom surface 11 in a longitudinal direction; and lateral sidewalls 13 and 13 which rise up from the side portion of the bottom surface 11 in a lateral direction. The case 10 is made of a metal material, such as an aluminum alloy or a zinc alloy.

In overhang portions 14 and 14 which overhang toward the outer side of the case from the lateral sidewalls 13 and 13, bolt insertion holes 14a and 14a for inserting bolts 42 (refer to FIG. 7 to be described below) are provided. Upper surfaces of the lateral sidewalls 13 and 13 are flush with upper surfaces of the overhang portions 14 and 14. In one of the lateral sidewalls 13 and 13, a wiring hole 13a for allowing the wiring (not illustrated) to pass therethrough is provided. A slit 13b is provided in the wiring hole 13a.

A thin plate-like partition 15 which divides the inside of the case is vertically installed from a part in the middle of the bottom surface 11 in the longitudinal direction. The partition 15 extends along the case lateral direction, and both ends are linked to the longitudinal sidewalls 12 and 12. A notch portion provided in the center portion in the case lateral direction of the partition 15 becomes a shaft insertion portion 15a into which a shaft 23 (refer to FIG. 4) of the vibrator 20 which will be described later is inserted. In addition, in the partition 15, two bolt insertion holes 15b and 15b for inserting a bolt 40 (refer to FIG. 5) which will be described later by nipping the shaft insertion portion 15a are provided.

Figure 4:
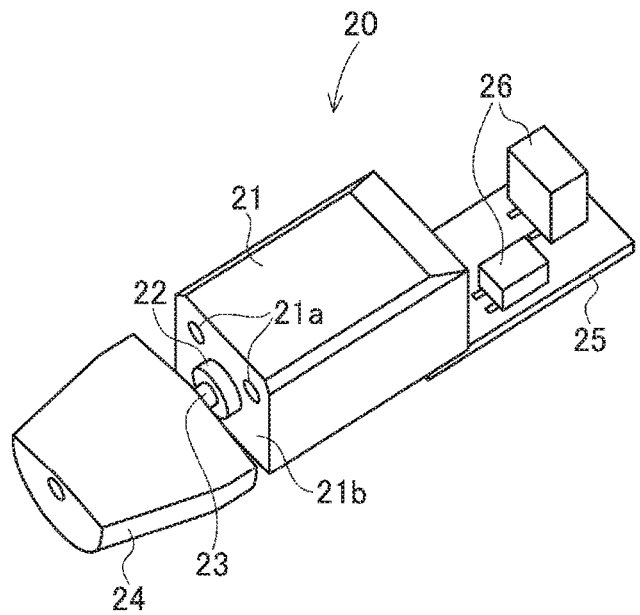
FIG. 4 is a perspective view of a vibrator.

FIG. 4 is a perspective view of the vibrator 20. As illustrated in FIG. 4, the vibrator 20 allows the rotation driving shaft 23 to protrude from one end surface 21b of a motor main body 21 in a shape of a substantially rectangular parallelepiped, and an eccentric weight 24 is attached to the end portion of the rotation driving shaft 23. The rotation driving shaft 23 is pivotally supported to be freely rotatable by a pivotally supporting portion 22 that protrudes from the end surface 21b. In the end surface 21b, two bolt holes 21a and 21a including a female screw are formed.

In a circuit board 25 of the vibrator 20, a plurality of elements 26, such as an electronic circuit provided with a connector which couples the wiring (not illustrated) that supplies a voltage and an IC chip that removes electric noise, are loaded. The motor main body 21 is assembled to the circuit board 25.

Figure 5:
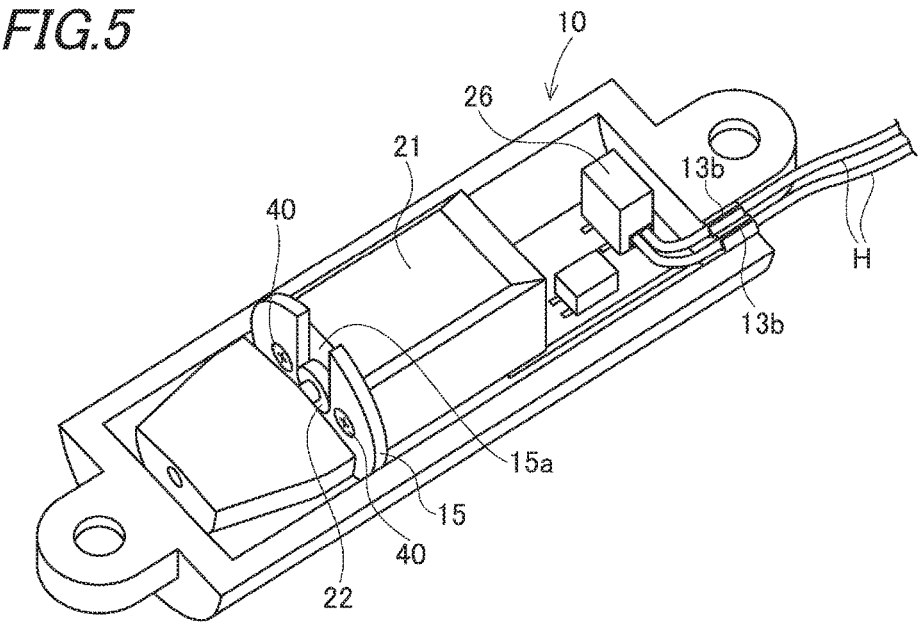
FIG. 5 is a perspective view of the vibrator case to which the vibrator is attached.

In attaching the vibrator 20 to the case 10, first, as illustrated in FIG. 5, by making the pivotally supporting portion 22 of the vibrator 20 fitted to the shaft insertion portion 15a of the partition 15 of the case 10, the vibrator 20 is set in the case 10. Since the shaft insertion portion 15a has a notch shape, the vibrator 20 to which the weight 24 is attached can be easily set in the case 10. Next, the bolts (screws) 40 and 40 are screwed to the bolt holes 21a and 21a of the end surface 21b of the motor main body 21 via the bolt insertion holes 15b and 15b. Accordingly, the vibrator 20 can be attached and fixed to the case 10.

After attaching the vibrator 20 to the case 10, a wiring H from the slit 13b is fitted into the wiring hole 13a and is connected to the element 26. Otherwise, the wiring H which passes through the wiring hole 13a may attach the vibrator 20 connected to the element 26, to the case 10.

Figure 6:
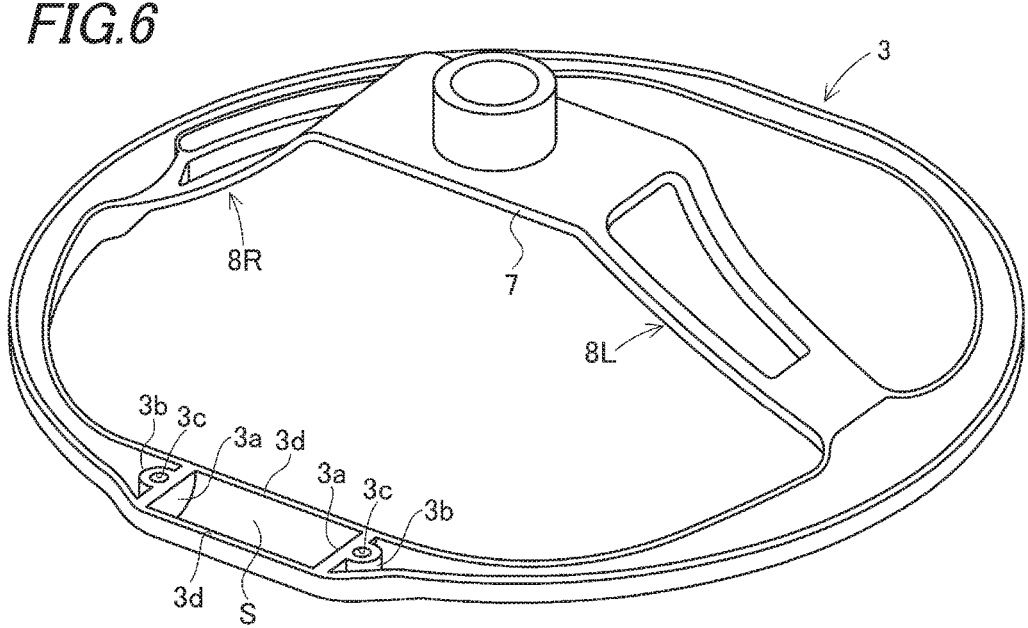
FIG. 6 is a perspective view when a core metal of a wheel portion is viewed from a side opposite to an occupant.

FIG. 6 is a perspective view when the core metal 3 of the wheel portion 2 is viewed from a side opposite to the occupant. On the six o'clock side of the wheel portion 2, a sectional shape in a radial direction of the wheel portion 2 of the core metal 3 is a substantially U shape. In other words, the core metal 3 includes one pair of sidewalls 3d and 3d, and a top wall (numeral reference thereof is omitted) that links the occupant sides of the sidewalls 3d and 3d to each other, and the side opposite to the occupant is open. The core metal 3 is made of metal, such as iron. On the six o'clock side of the core metal 3, two partition walls 3a and 3a which divide the inside of a U-shaped groove of the core metal 3 and divide and form the vibrator housing portion S are provided. A part between the partition walls 3a and 3a is the vibrator housing portion S that houses the vibrator 20 therein. The partition walls 3a and 3a are linked to both sidewalls 3d and 3d of the U-shaped groove. The partition walls 3a and 3a are joined to the core metal 3, for example, by welding. The U-shaped groove of the core metal 3 may be an angular U-shaped groove.

In overhang portions 3b and 3b which overhang to the side opposite to the vibrator housing portion S from the partition walls 3a and 3a, the bolt holes 3c and 3c having a female screw are formed. A surface on the side opposite to the occupant of the partition walls 3a and 3a and a surface on the side opposite to the overhang portions 3b and 3b are made as one surface.

Figure 7:
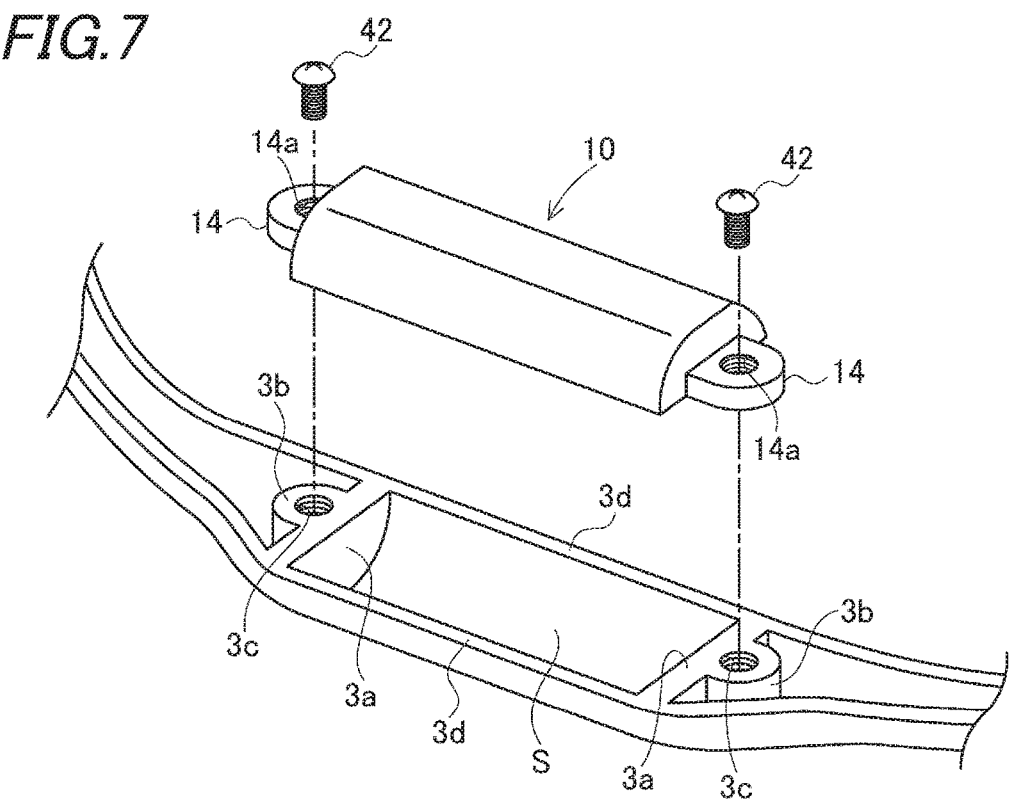
FIG. 7 is an exploded perspective view for describing a vibrator case attaching method to the core metal.

In attaching the case 10 attached with the vibrator 20 to the core metal 3, first, as illustrated in FIG. 7, by making the case 10 face the vibrator housing portion S, edge portions (upper surfaces) 12a and 12a (refer to FIG. 3) of the longitudinal sidewalls 12 and 12 of the case 10, and the surfaces on the side opposite to the occupant of the sidewalls 3d and 3d of the U-shaped groove of the core metal 3 abut against each other. In addition, edge portions (upper surfaces) of the lateral sidewalls 13 and 13 of the case 10 and edge portions (surfaces on the side opposite to the occupant) of the partition walls 3a and 3a of the core metal 3 abut against each other. Accordingly, an open surface of the vibrator housing portion S is covered with the case 10.

In addition, positions of the bolt insertion holes 14a and 14a of the case 10 and the bolt holes 3c and 3c of the core metal 3 are matched, and the bolts (screws) 42 and 42 are inserted into the bolt insertion holes 14a and 14a and are screwed to the bolt holes 3c and 3c. Accordingly, the case 10 can be fixed to the core metal 3.

When attaching the case 10 to the core metal 3, it is preferable that a void between the case 10 and the core metal 3 is sealed by a sealing material 30 (refer to FIG. 2). The sealing material 30 may be provided between the case 10 and the partition walls 3a and 3a. In the sealing material 30, ethylene propylene diene rubber (EPDM), urethane elastomer, or the like can be used.

Figure 8A:
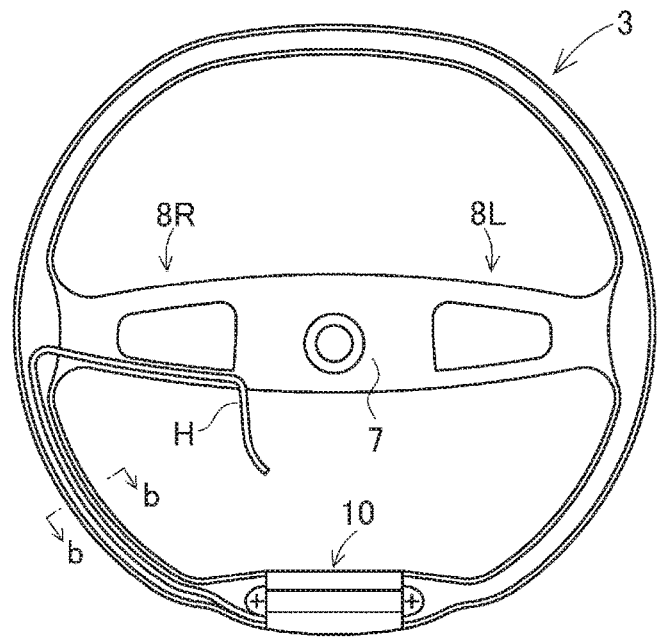
FIG. 8A is a plan view illustrating a disposition example of a wiring.
Figure 8B:
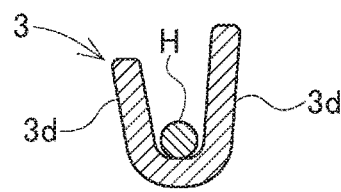
FIG. 8B is a sectional view taken along a line b-b of FIG. 8A.

As illustrated in FIGS. 8A and 8B, the wiring H which is drawn out from the vibrator housing portion S via the wiring hole 13a, is drawn around in the U-shaped groove of the core metal 3 in the circling direction, and is guided to the steering hub portion 7 along the spoke portion 8L or 8R from a connection location between the wheel portion 2 and the spoke portion 8L or 8R, and the connector of the wiring tip end coming out of the steering hub portion 7 is connected to the electronic control circuit (not illustrated). It is preferable that a rib is provided in the U-shaped groove of the core metal 3 and then the wiring H is positioned and fixed in the U-shaped groove.

After attaching the case 10 to the core metal 3, the core metal 3 is covered with the urethane foam layer 4. The urethane foam layer 4 is embedded in the U-shaped groove of the core metal 3, and covers the core metal 3 and the case 10. Next, by covering and stitching the urethane foam layer 4 with the leather 5, the steering wheel 1 can be prepared. Since the part between the case 10 and the core metal 3 is sealed, the urethane foam layer 4 can be prevented from entering the inside of the vibrator housing portion S.

In the embodiment, the vibrator 20 can be assembled to the steering wheel 1 by performing simple work of fixing the vibrator 20 to the case 10 using the bolts 40 and attaching the vibrator-attached case to the core metal 3 using the bolts 42.

In order to attach the vibrator 20 to the core metal 3 of the wheel portion 2, the spoke portion for attaching the vibrator 20 is not necessary and it is also not necessary to increase the thickness of the spoke portion, whereby a degree of freedom in design of the steering wheel 1 can be improved.

Since the end surface 21b of the motor main body 21 of the vibrator 20 abuts against the partition 15 which is vertically installed from the bottom surface of the case 10 and the case 10 is attached to the core metal 3, the vibration generated by the vibrator 20 is efficiently transmitted to the core metal 3, and the vibration can be acknowledged to a driver who holds the steering wheel 1.

In a case where the entire vibrator 20 is configured to be housed in the U-shaped groove of the core metal 3, it is necessary to increase the thickness of the core metal 3 (increase the U-shaped groove) in proportion to the size of the vibrator 20. However, in the embodiment, the vibrator 20 is disposed in a region surrounded by the case 10, which is a long box-like container having an open upper surface, and the U-shaped groove of the core metal 3. In other words, only a part of the vibrator 20 is positioned in the U-shaped groove of the core metal 3. Therefore, even when the size of the vibrator 20 is increased, the thickness of the core metal 3 can be suppressed.

In the above-described embodiment, both sides in the longitudinal direction of the case 10 are screwed to the core metal 3 by using the bolts 42, but the movement in the upward-and-downward direction on one side in the longitudinal direction may be regulated by allowing the case 10 to slide, and the other side may be screwed.

In the above-described embodiment, the vibrator 20 is provided on the six o'clock side (lower side) of the wheel portion 2, but may be provided at another position, such as the twelve o'clock side (upper side). In addition, a plurality of vibrators 20 may be provided.

In the above-described embodiment, the vibrator 20 is attached to the case 10, but the vibrator 20 may be attached to the core metal 3. For example, a member which is similar to the partition 15 of the case 10 is provided in the vibrator housing portion S of the core metal 3, and the vibrator 20 is set in the vibrator housing portion S to be attached to the member. After this, the vibrator housing portion S is covered with the case 10.

Any of the above-described embodiments is an example of the invention, and the invention is not limited to the aspects illustrated in the drawings. For example, the sectional shape in the radial direction of the core metal 3 is not limited to the U-like shape, and may be a J-like shape.

A heater may be provided between the urethane foam layer 4 and the leather 5 of the cover layer that covers the core metal 3. The leather 5 may be omitted from the cover layer that covers the core metal 3.

The vibrator housing portion S of the wheel portion 2 and the vicinity thereof may not be covered with the leather 5, and the surface of the case 10 that is attachable and detachable may be configured to be exposed. In this configuration, it is possible to easily exchange the vibrator 20.

In the core metal 3 illustrated in FIG. 6, the six o'clock side on which the vibrator housing portion S is provided is a linear flat portion, and in a case where the core metal 3 is used, the steering wheel 1 can be a so-called flat bottom type (D shape).

Figure 9:
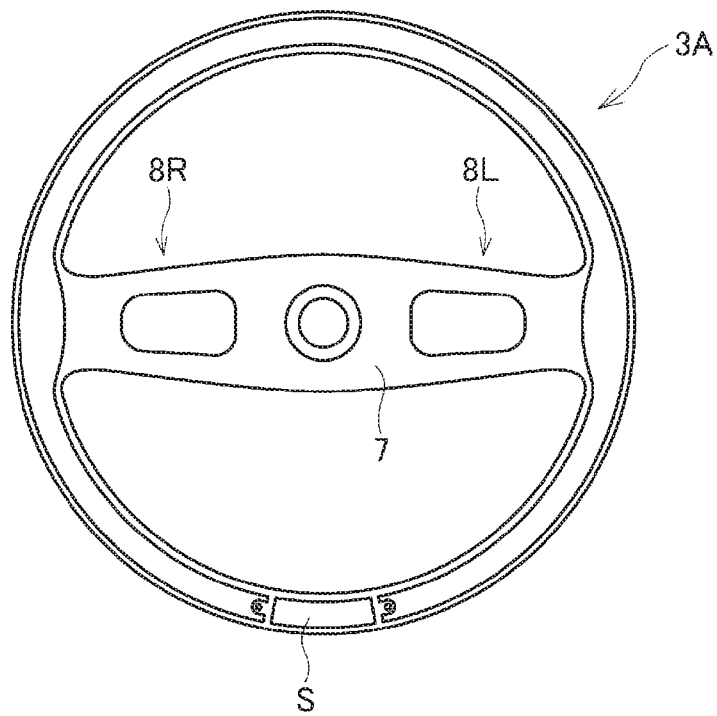
FIG. 9 is a plan view of a core metal according to a modification example.
Figure 10:
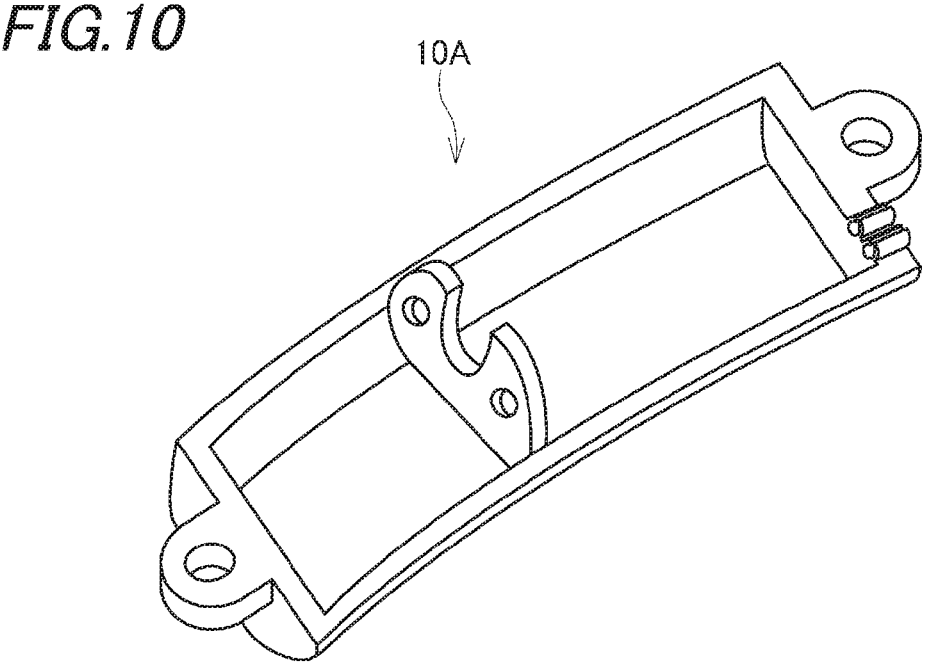
FIG. 10 is a perspective view of a vibrator case according to the modification example.

In a case where the steering wheel 1 has a completely round shape, similar to a core metal 3A illustrated in FIG. 9, the vibrator housing portion S has a shape which is slightly curved along the longitudinal direction (circling direction), and in accordance with this, as illustrated in FIG. 10, it is preferable to use a case 10A curved in the longitudinal direction.

Figure 11A:
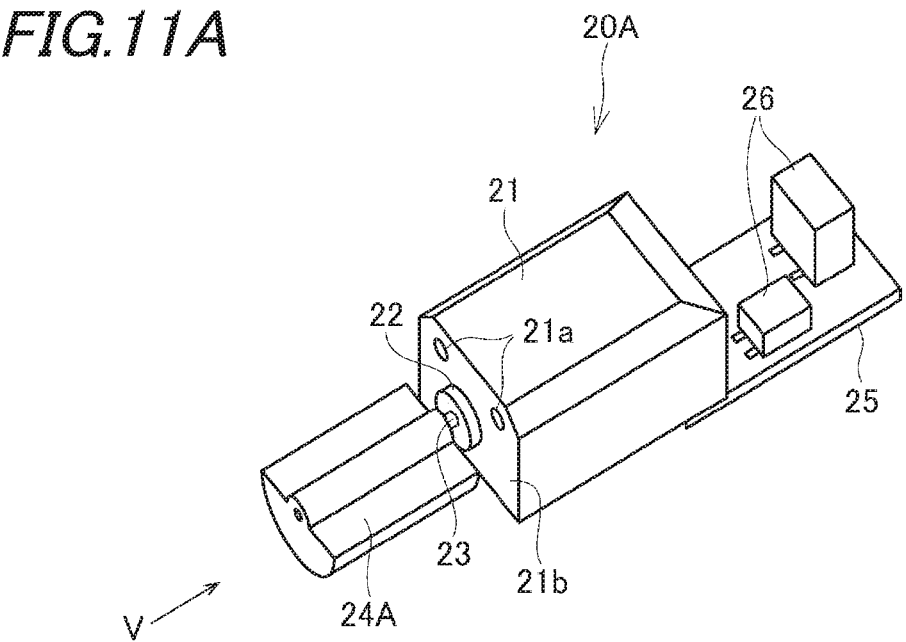
FIG. 11A is a perspective view of a vibrator according to the modification example.
Figure 11B:
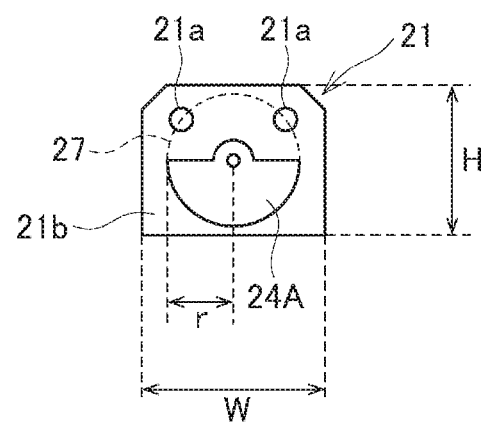
FIG. 11B is a side view viewed from an arrow direction of FIG. 11A.

As illustrated in FIGS. 11A and 11B, it is preferable that the vibrator attached to the case 10A is a vibrator 20A of which a weight 24A is small. FIG. 11B is a side view of the vibrator 20A when viewed from an arrow V direction of FIG. 11A.

In the weight 24A, a section in the direction orthogonal to the shaft direction of the rotation driving shaft 23 has a substantially semicircular shape or a shape of a substantial fan, and in a case where a radius is r, a width of the motor main body 21 is W, and a height is H, 2r<W and 2r<H are satisfied.

A dimension in the direction orthogonal to the rotation driving shaft 23 of the weight 24A is smaller than the width W and the height H of a motor main body. In other words, the outermost circumferential edge 27 of a rotation track when the weight 24A rotates around the shaft center of the rotation driving shaft 23, is positioned further on the inner side than the outer circumferential edge of the end surface 21b of the motor main body 21, when viewed from the side like the case of FIG. 11B.

A dimension in the direction parallel to the rotation driving shaft 23 of the weight 24A is appropriately determined in accordance with the size of the vibrator housing portion S or the required vibration amount.

By reducing the size of the weight 24A in this manner, the vibrator 20A is easily attached to the curved case 10A.

The location in which the vibrator housing portion S is formed is not limited to the six o'clock side (lower side) of the core metal 3A, and the vibrator housing portion S can be provided in one or plural arbitrary locations.

Figure 12A:
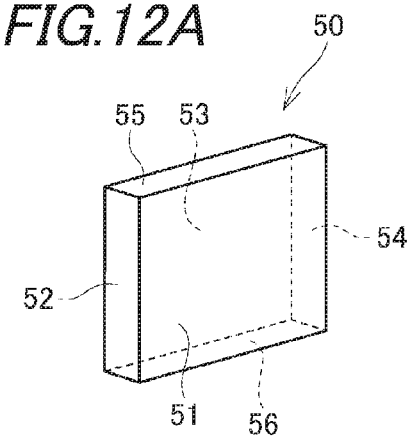
FIGS. 12A and 12B are perspective views of a board housing case.

The wiring H which is drawn out from the vibrator housing portion S and is drawn around in the circling direction in the groove of the core metals 3 and 3A is connected to an electronic control circuit provided in the vicinity of the steering hub portion 7. As illustrated in FIG. 12A, the electronic control circuit is housed in a board housing case 50 having a shape of a substantially rectangular parallelepiped made of six flat surfaces, and is disposed adhering to a body cover of the steering wheel with an adhesive or the like.

Figure 12B:
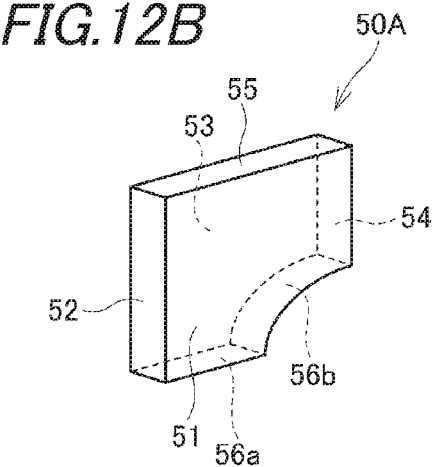

The board housing case may have a shape of which at least a part is curved. For example, as illustrated in FIG. 12B, a board housing case 50A in which the curved surface 56b is linked to a flat surface 56a may be used.

Figure 13:
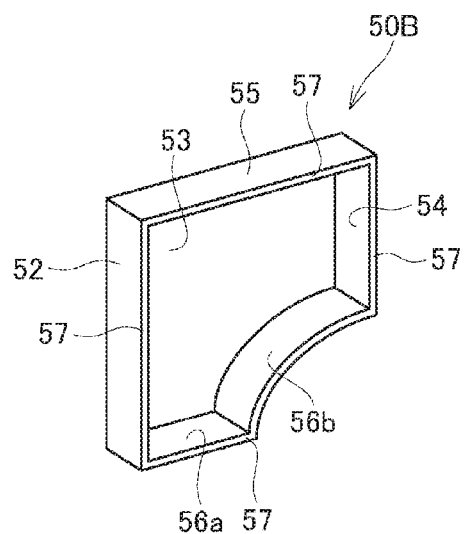
FIG. 13 is a perspective view of the board housing case.

As illustrated in FIG. 13, the electronic control circuit may be housed in a board housing case 50B of which one surface is open. An outer edge 57 of an open surface of the board housing case 50B abuts against the body cover, and adheres thereto with an adhesive or the like. The open surface is closed being covered with other members, such as the body cover or the like. By opening one surface, the size of the board housing case 50B can be reduced, and the degree of freedom in design of the steering wheel can be increased.

In a case where the open surface can be covered with other members, such as the body cover, the board housing case may include two or more open surfaces.

What is claimed is:

1. A steering wheel comprising:
   a steering hub portion;
   a wheel portion; and
   a spoke portion that extends from the steering hub portion and that is connected with the wheel portion,
   wherein the wheel portion includes:
      a core metal which circles around the steering wheel; and
      a cover layer which covers the core metal,
   a vibrator housing portion is provided at a part in a circling direction of the core metal,
   the core metal includes a U-shaped cross section in the vibrator housing portion in a radial direction of the wheel portion,
   a partition wall is provided inside of the core metal to divide and form the vibrator housing portion,
   a case is attached to the core metal to cover the vibrator housing portion,
   the vibrator is disposed in the vibrator housing portion between the core metal and the case, and
   the vibrator is attached to the case
   wherein the case includes:
      a bottom surface which has a rectangular shape;
      longitudinal sidewalls which rise up from side portions of the bottom surface in a longitudinal direction; and
      lateral sidewalls which rise up from the side portions of the bottom surface in a lateral direction,
   wherein a partition is vertically installed from the bottom surface to divide the inside of the case,
   the partition extends along the lateral direction, and
   the vibrator is attached to the partition,
   wherein the vibrator includes a motor main body, a rotation driving shaft which protrudes from the motor main body, and a weight which is attached to the rotation driving shaft,
   a notch is provided in the partition,
   the rotation driving shaft is inserted into the notch, and
   the motor main body is attached to the partition,
   wherein a dimension of the weight of the vibrator in a direction orthogonal to the rotation driving shaft is smaller than a width of the motor main body, and
   the dimension of the weight of the vibrator is smaller than a height of the motor main body.

2. The steering wheel according to claim 1,
   wherein the longitudinal sidewall of the case and a sidewall of the core metal face each other, and
   the lateral sidewall of the case and the partition wall of the core metal face each other.

3. The steering wheel according to claim 2,
   wherein a bolt insertion hole is provided in a first overhang portion which overhangs toward an outer side of the case from the lateral sidewall of the case,
   a bolt hole is provided in a second overhang portion which overhangs on a side opposite to the vibrator housing portion from the partition wall of the core metal, and
   a bolt inserted into the bolt insertion hole is screwed to the bolt hole.

4. The steering wheel according to claim 1,
   wherein a sealing material is provided between the case and the core metal, and between the case and the partition wall.

5. The steering wheel according to claim 1, further comprising:
   a wiring that is inserted into a wiring hole provided on the lateral sidewall,
   wherein the wiring is disposed along the circling direction inside the core metal.

6. The steering wheel according to claim 5,
   wherein a tip end portion of the wiring is connected to an electronic control circuit,
   the electronic control circuit is housed in a board housing case of which at least one surface is open, and
   an open surface of the board housing case is covered with another member.

7. The steering wheel according to claim 1,
   wherein the case is curved in the longitudinal direction.

* * * * *